United States Patent [19]

Brewster

[11] Patent Number: 5,326,439
[45] Date of Patent: Jul. 5, 1994

[54] IN-SITU CHROMATE REDUCTION AND HEAVY METAL IMMOBILIZATION

[75] Inventor: Michael D. Brewster, Tonawanda, N.Y.

[73] Assignee: Andco Environmental Processes, Inc., Amherst, N.Y.

[21] Appl. No.: 21,447

[22] Filed: Feb. 24, 1993

[51] Int. Cl.⁵ ............................................. C02F 1/461
[52] U.S. Cl. ..................................... 204/149; 210/748
[58] Field of Search ......................... 204/149; 210/748

[56] References Cited

U.S. PATENT DOCUMENTS

| | | | |
|---|---|---|---|
| 1,012,808 | 12/1911 | Bull | 204/149 |
| 3,823,081 | 7/1974 | Treharne et al. | 204/149 |
| 3,926,754 | 12/1975 | Lee | 204/152 |
| 4,163,716 | 8/1979 | Turnbull | 210/28 |
| 4,188,272 | 9/1979 | Gale et al. | 204/149 |
| 4,318,788 | 3/1982 | Duffey | 204/149 |
| 4,318,789 | 3/1982 | Marcantonio | 204/152 |
| 4,321,125 | 3/1982 | Nazarian et al. | 204/273 |
| 4,676,878 | 6/1987 | Chez | 204/101 |
| 4,693,798 | 9/1987 | Gale et al. | 204/149 |
| 4,839,007 | 6/1989 | Kotz et al. | 204/149 |
| 4,880,510 | 11/1989 | Uhrich | 204/131 |
| 4,882,018 | 11/1989 | Tison | 204/105 R |

FOREIGN PATENT DOCUMENTS 2202862A 10/1988 United Kingdom .

Primary Examiner—John Niebling
Assistant Examiner—Arun S. Phasge
Attorney, Agent, or Firm—Lowe, Price, LeBlanc & Becker

[57] ABSTRACT

A process for removing heavy metal contaminants from groundwater without injecting anion contaminants thereinto and without providing surface sludge for disposal is described. The process consists of withdrawing a flow of groundwater containing the contaminants and passing the flow of groundwater through an electrochemical cell having at least an anion of iron or an iron containing alloy wherein the cell consists of an anode, a cathode, and a plurality of closely spaced additional electrodes disposed therebetween. The cell then generates ferrous ion and hydroxyl ions into the solution which is then reinjected upstream of the flow. In-situ then hexavalent chromium will be reduced to nontoxic trivalent chromium and will form an insoluble iron containing compound or complex with the hydroxide to immobilize the chromium in-situ. Other heavy metal contaminants similarly will be immobilized by reacting with the iron, or through the absorbent properties of a ferrous iron hydroxide generated.

5 Claims, 4 Drawing Sheets

IN-SITU CHROMATE REDUCTION AND HEAVY METAL IMMOBILIZATION

BACKGROUND OF THE INVENTION

This invention relates to a process for treating groundwater to remove heavy metal contaminants therefrom by immobilizing the same in-situ. The process of this invention then eliminates the need for conventional pump and treat type schemes wherein contaminants are removed in settling ponds or the like, which in turn, then, require sludge handling techniques to dispose of the toxic sludge.

DESCRIPTION OF THE PRIOR ART

Waste liquid or aqueous media containing toxic materials such as hexavalent chrome and other heavy metals have been treated according to the techniques described, for example, in U.S. Pat. Nos. 3,926,754; 4,036,726; and 4,123,339 assigned to the assignee of this invention. In those patents, the media being treated was primarily cooling tower blow-down water containing hexavalent chromium ions. The disclosures of those patents, however, are hereby incorporated by reference.

In the above patents a process and apparatus were described wherein wastewater containing hexavalent chromium ions is caused to flow between a plurality of electrodes. It was discovered that when the anode has a surface or a portion of the surface of iron or an iron alloy or insoluble iron compound, an iron compound such as iron hydroxide will be produced electrochemically. In turn, an insoluble trivalent chromium compound, preferably as the hydroxide, will be produced which will complex with or otherwise physically or chemically combine with the insoluble iron compound to thereby permit removal from solution. Whereas it was previously considered necessary to reduce hexavalent chromium to trivalent chromium in acidic solution, it was discovered that the iron compound or complex formed will reduce the hexavalent chromium and coprecipitate therewith in solution having a pH of about 4 to about 11. Accordingly, the invention described and claimed in said patents produces an insoluble iron chromium precipitate without pH adjustment to thereby rapidly and efficiently remove hexavalent chromium from solution. The precipitate is then removed from the aqueous media utilizing conventional techniques such as a clarifier, settling pond, or the like, and the aqueous media thereby clarified is suitable for disposal.

In this process, hexavalent chromium undergoes cathodic reduction to form trivalent chromium as insoluble chromic hydroxide which complexes with iron which enters solution at the anode. The products are not susceptible to further electrolytic oxidation at the anode, back to hexavalent chromium, apparently due to the difference in ionization potential, at least in part, because the production of the hydroxide ion at the cathode occurs at a much lower potential than other electrode reactions. Thus, because of the nonamphoteric state of the iron complex, the reaction continues until the undesirable contaminating ions are completely or substantially completely removed from solution in the aqueous media.

In a related U.S. Pat. No. 4,318,788, also assigned to the assignee of this invention, it was described that the processed water containing the iron-chromium solids or flocculent normally flows from the electrolytic cell to a clarifier wherein the solids settle and collect at the bottom thereof. The overflow discharge is water containing less than 0.05 ppm chromium, suitable for disposal. In contrast, the initial contaminant concentration of the water would be no less than 0.03 ppm and in most instances from 1 to 5,000 ppm. The underflow from the clarifier then is normally dewatered by centrifugation, and the solids from the centrifuge filtered. Both the centrate and filtrate are then returned to the clarifier. The solids from the filter, iron chromium hydroxide at a concentration of about 50% solids, are disposed of according to acceptable toxic sludge disposal techniques.

Recognizing, however, that in the case of cooling tower water fresh cooling tower makeup water must be added to the tower continually and this makeup water requires the addition of fresh hexavalent chromium salts, it was discovered that the sludge could be reprocessed to separate the trivalent chromium from the sludge and oxidize it to hexavalent chromium for recycling in fresh makeup water. Oxidation, however, required a strong oxidizing agent such as chlorine gas with the reaction occurring at a pH preferably of between 8 and 10 and at room temperature.

The ferric hydroxide and chromic hydroxide sludge from the electrochemical cell described above typically has a concentration of 3 parts ferric hydroxide to one part chromic hydroxide by weight. The process was capable of removing 24 pounds per day of hexavalent chromium from a flow of, for example, cooling tower blow down water of 200 gallons per minute having a concentration of about 10 ppm hexavalent chromium. As noted above, treatment in the electrolytic cell then produces a flocculent which is stable against reoxidation except in the presence of a very strong oxidizing agent such as chlorine gas.

As is well known, heavy metal contamination also presents a significant problem in ground water. The presence of metals such as hexavalent chromium, zinc, copper, nickel, lead, antimony, arsenic, and the like can present a significant health risk. When these metals leach into the ground water from, for example, superfund sites, cleanup may be extremely difficult.

It is known to inject salts into the aquifer to react with metal contaminants. This, however, creates an additional problem of further contamination with, for example, sulfate or chloride ions.

In conventional pump and treat situations, the groundwater is pumped to the surface, treated, filtered or passed through a settling pond and then returned. This creates a sludge byproduct which must be disposed of as a toxic material similar to that described above relative to cooling tower blow down water purification.

Accordingly, it would be desirable to be able to purify the aquifer to remove toxic metal contaminants without creating a toxic sludge disposal problem.

SUMMARY OF THE INVENTION

It has been discovered that the heavy metal contaminants in groundwater can be removed by immobilization in-situ rapidly and efficiently through the use of the electrochemical cell of this invention as a source of ferrous ions. The electrochemical cell of this invention consists of a plurality of closely spaced electrode plates wherein an anode is provided at one end and a cathode at the opposite end with adjacent faces bearing opposite charges by induction. The anode must be an iron containing material such as steel and, preferably, the cathode also is the same material. The water then is passed through the cell between the electrodes and the sacrificial anode generates ferrous ion into solution. The water is then returned to the aquifer wherein the flocculent formed either reduces the metal contaminant as in the case of hexavalent chromium to form an insoluble compound or complex, or otherwise immobilizes the metal contaminant in-situ. Accordingly, the water treated is returned to the aquifer after having added only ferrous and hydroxyl ions from the electrochemical cell. In-situ chromate reduction then occurs to immobilize the chromate contaminant, or other heavy metal contaminant to thereby remove the same from the aquifer without presenting a toxic sludge disposal problem.

Accordingly, it is an object of this invention to provide a process for removal of heavy metal contaminants from groundwater without adding contaminating anions to the aquifer or generating toxic sludge for surface disposal.

It is another object of this invention to provide an electrochemical means for generating ferrous ion which is injected into the aquifer to thereby react with and immobilize heavy metal contaminants in-situ.

It is another object of this invention to provide a method for electrolytically purifying groundwater to remove impurities in-situ through the use of an electrolytic cell having an anode of iron, iron alloy, or an insoluble iron compound which generates ferrous ion to be injected into the groundwater to be purified.

These and other objects will be readily apparent with reference to the following drawings and description wherein:

DETAILED DESCRIPTION OF THE INVENTION

The process of this invention is particularly adapted to confined or unconfined aquifer containing hexavalent chromium in, for example, from one to 50 ppm and other heavy metals including zinc, copper, nickel, lead, antimony, and the like in a concentration of, for example 2 to 10 ppm. Most preferably, the process of this invention is adapted to use with an unconfined porous aquifer containing hexavalent chromium in a concentration of between about 1 and 20 ppm.

The electric cell used in the process of this invention is the Andco cell described and claimed, for example, in U.S. Pat. Nos. 3,926,754; 4,036,726; and 4,123,339.

Figure 1:
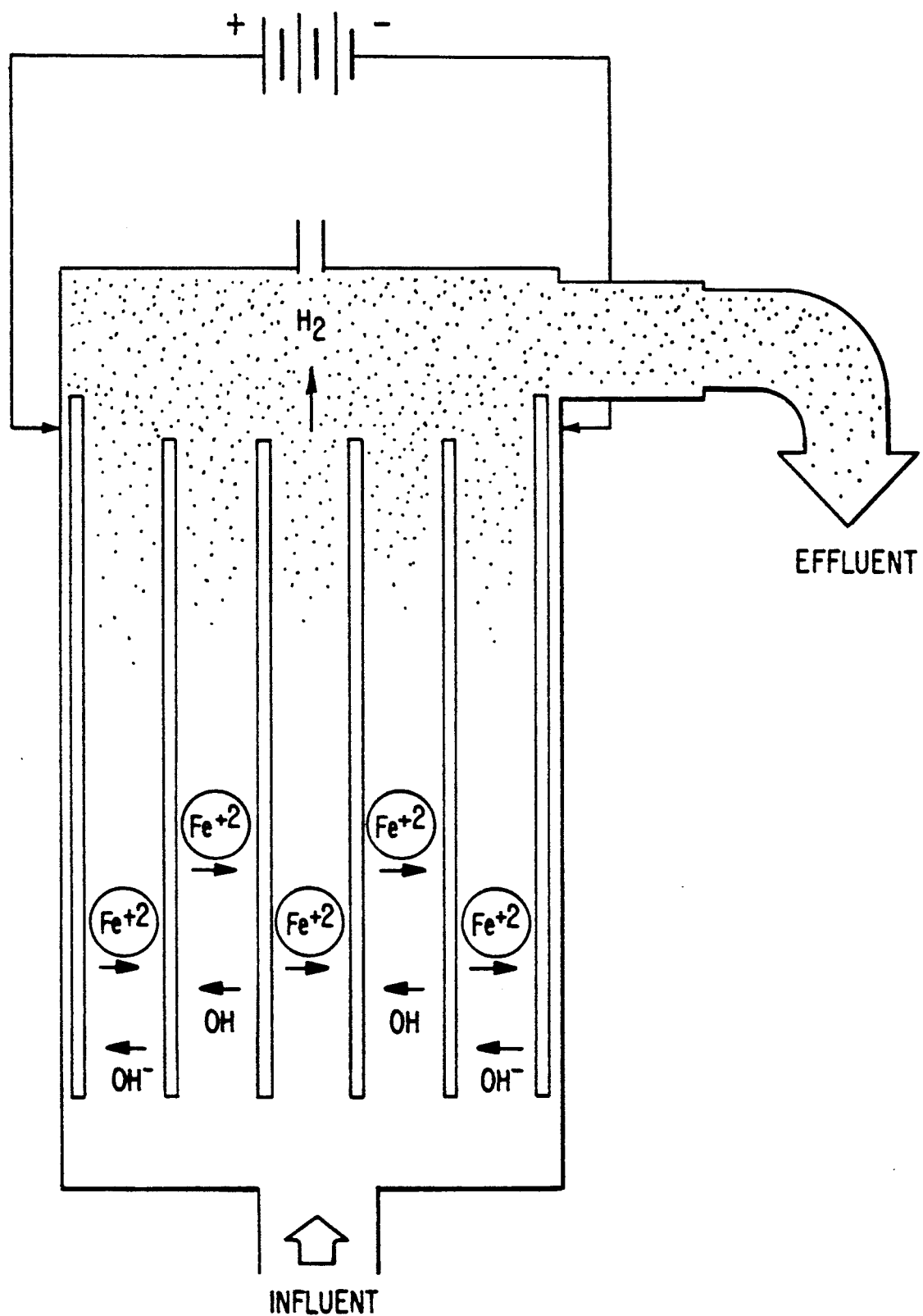
FIG. 1 is a schematic representation of the process of this invention.

FIG. 1 is a schematic of the Andco cell as utilized in the process of this invention. Process water is pumped through the cell and it flows through the gaps in contact with the electrodes. As direct current flows from electrode to electrode through the process water, ferrous and hydroxyl ions are given off opposite sides of each sacrificial electrode. The cell itself, as noted above, utilizes a plurality of closely spaced plate electrodes and a pair of end electrodes, one disposed at either end of the cell. When current is applied to the end electrodes, then the intermediate electrodes become polarized by induction so that each of said intermediate sacrificial electrodes has a positive face and a negative face.

Because each of the electrodes has an anode which is iron containing, ferrous ions will be generated at the anode. In a preferred embodiment of this invention, the electrodes are cold rolled steel plates.

With ferrous ions present, hexavalent chromium will be reduced readily and result in the formation of trivalent chromium. If a sufficient concentration of hydroxyl ions is present, precipitation will occur. In this fashion then, highly toxic hexavalent chromium will be converted to minimally toxic insoluble chromic hydroxide.

Previously, it was known to inject iron salts into groundwater as a source of ferrous ion. As noted above, however, the major disadvantage with the use of such salts lies in the injection of the anions which may add contaminant chlorides, sulfates or the like to the groundwater.

According to the process of this invention where the predominant contaminant is hexavalent chromium, water will be extracted from the aquifer and passed through the Andco electrochemical cell. Ferrous ion addition will be in excess of the amount needed to totally reduce chromium which came in contact with the electrodes. Resulting water containing instantaneously reduced trivalent chromium and soluble ferrous ions will be reinjected upstream. If environmental regulations do not permit reintroduction of trivalent chromium into the aquifer, it can be removed in a conventional clarifier. The output from the clarifier then can be passed through a second, identical cell and then reinjected upstreat into the aquifer. If the initial pH is between 6.5 and 8.0, some hydrous ferric oxide will precipitate and be filtered out in the soil. Small, soluble ferrous ions will continue to move through the groundwater until they come in contact with soluble chromate species, chromate containing solids such as barium chromate, or chromate ions absorbed in the soil—water interface.

While conventional pump and treat systems work well to reduce chromate concentrations in the aqueous phase, they do have limitations. Chromate containing solids and adsorption hold hexavalent chromium in the soil to be released slowly over time. This is the main reason why such systems require long periods of time to achieve required limits. By performing in-situ chromate reduction as proposed herein, treatment times will be drastically shortened, sludge handling minimized or completely eliminated, treatment efficiency maximized and toxicity reduced. Another benefit is that hydrous iron oxide is an ideal absorbent of many other heavy metals. By immobilizing iron solids in the soil, many other contaminants once found in the aqueous phase, will show significant or total drops in concentration. In other words, by injecting an excess of ferrous ions in the soil, a hydrous specie will result which, in addition to immobilizing chromium by forming a complex or insoluble compound with the reduced trivalent specie, the excess ferrous ion will also form a hydrous specie which acts as an absorbent for other heavy metals which may contaminate the groundwater system. The system of this invention, however, does not contaminate the groundwater because, as noted above, the only species injected into the groundwater are ferrous ions in excess and hydroxyl ions.

Figure 2:
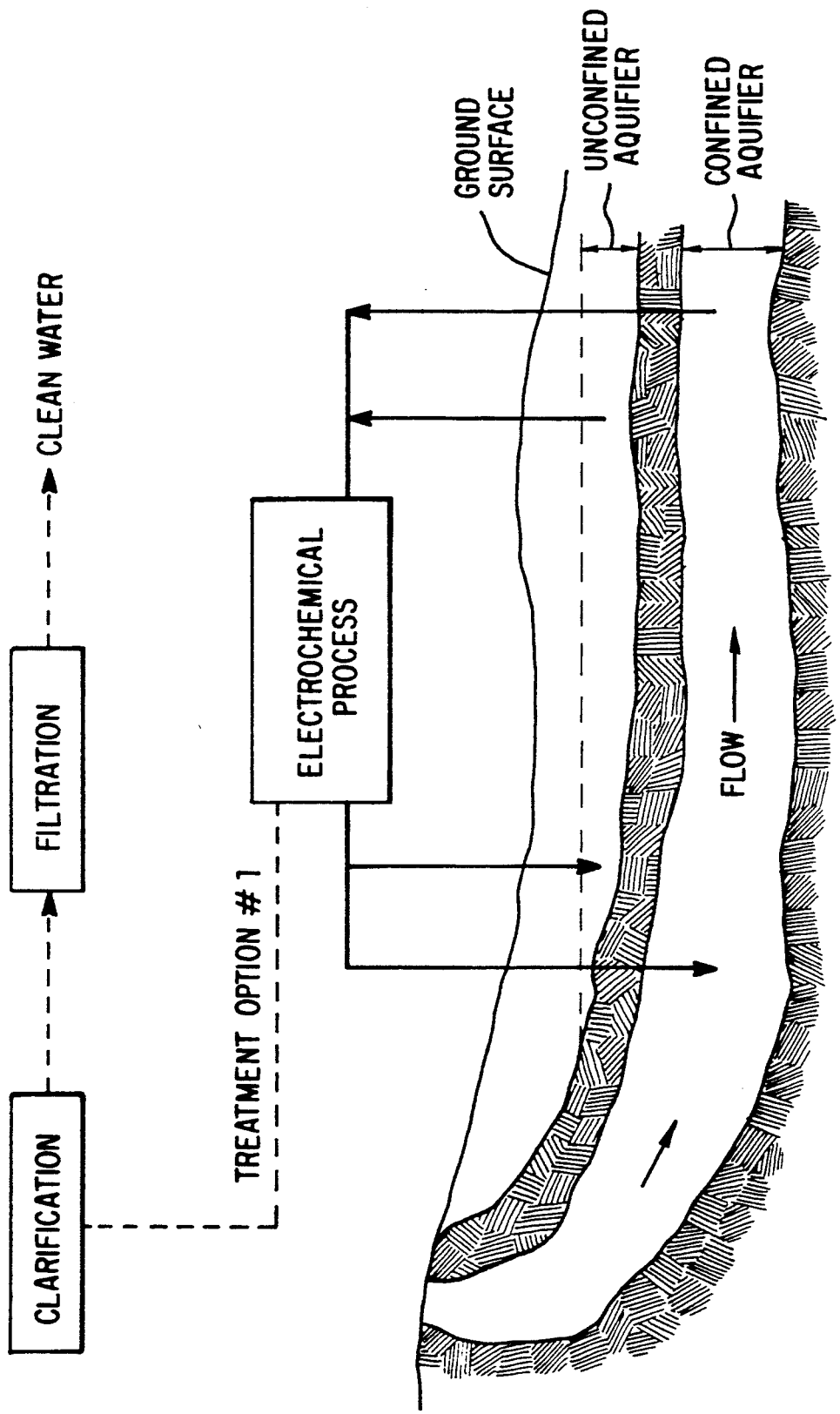
FIG. 2 is a schematic representation of the electrochemical cell used in the process of this invention.
Figure 3:
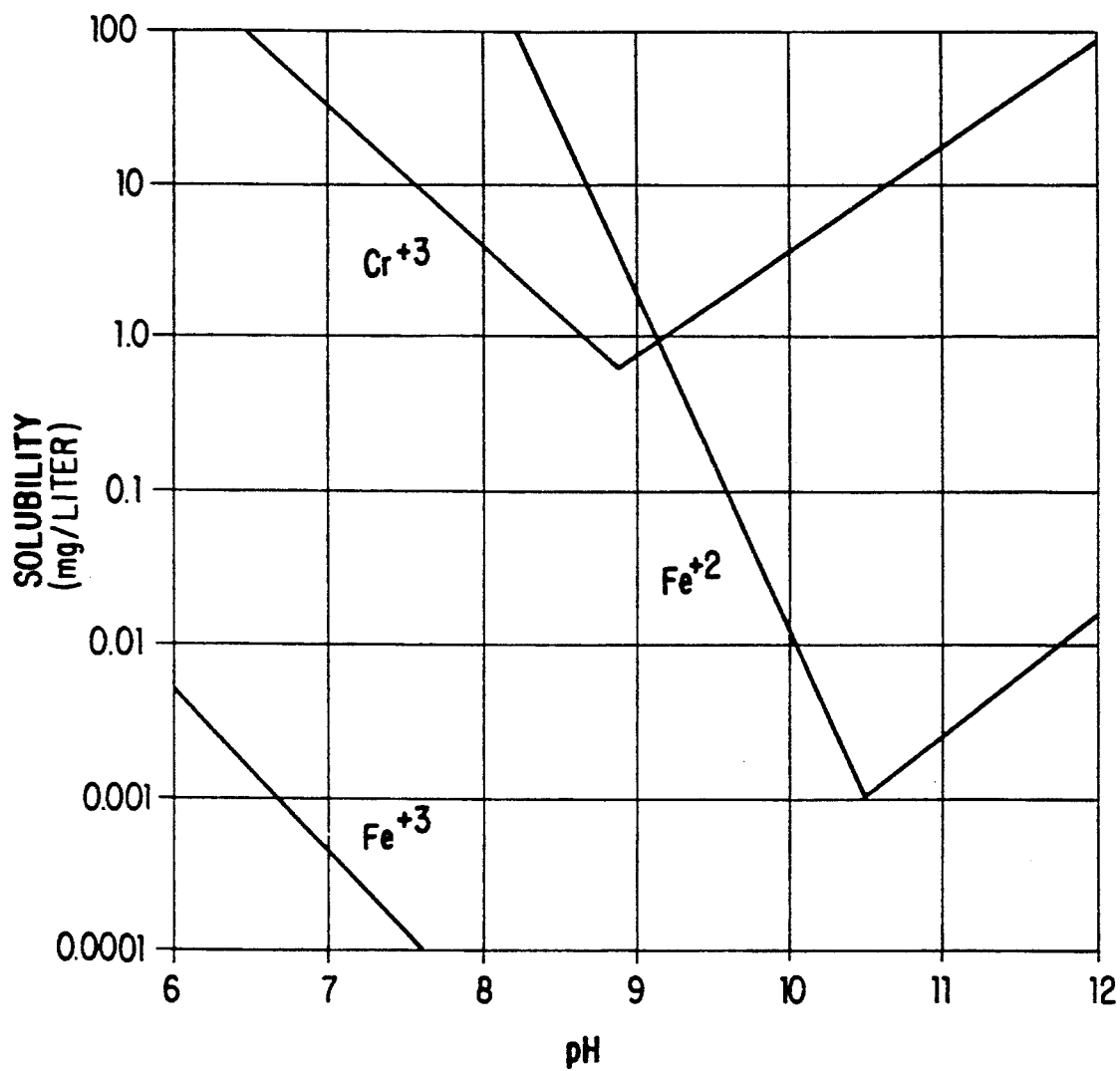
FIG. 3 is a graph depicting solubility of metals as a function of pH.

FIG. 2 then is a schematic representation of the Andco cell used in the process of this invention. FIG. 3 is a graph depicting the solubility of metals as a function of pH.

Typically the cell used in the process of this invention will have a unit throughput of about 20 gallons per minute and require a 480 volt power source. Obviously, however, the individual cells can be scaled up and an unlimited number of cells can be provided at a single installation.

Figure 4:
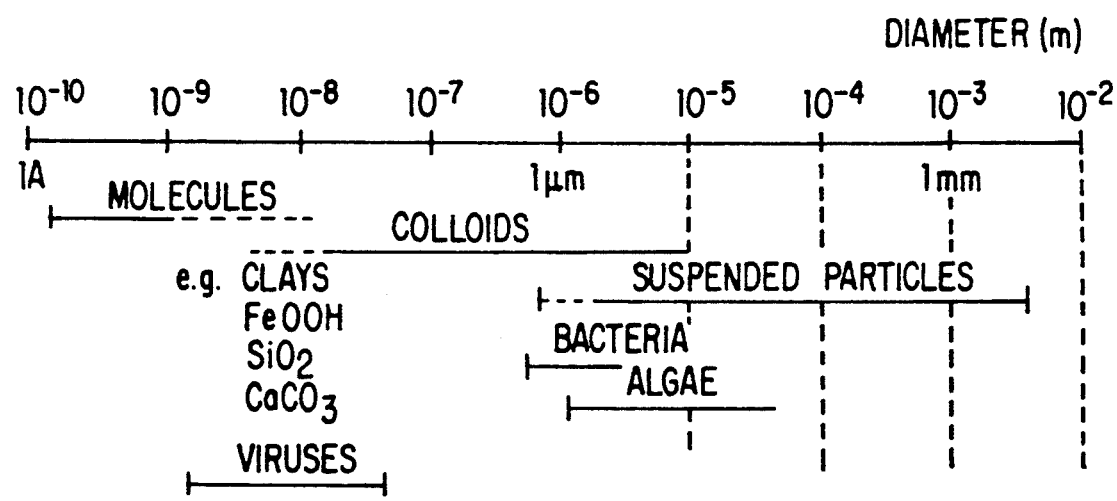
FIG. 4 is a table depicting relative particle sizes.

FIG. 4 is a graph depicting comparative particle size. As is shown, ferrous hydroxide particles are extremely small and, therefore, can only interfere with the process of this invention if it is to be utilized in clay soil.

The metal precipitants in the ground will remain quite stable because of the pH at which they precipitate and their relation to the groundwater pH. If the system is converted to a true pump and treat process, conventional solid separation steps must be used to collect sludges. However, in utilizing the process of this invention, the sludge disposal problem is completely eliminated.

In the use of cold and hot rolled steel anodes, a problem was encountered in commercial scale systems in the formation of adherent hydrous oxide gelatinous precipitates which can lead to blocking the flow channels in the cell. Another problem encountered was the formation of an insoluble insulating iron oxide layer on the electrode surface, often underneath the gelatinous precipitates which can give rise to high overvoltages and generation of oxygen at the anode. In U.S. Pat. No. 4,123,339, this problem was solved by a periodic wash with a dilute inorganic acid such as hydrochloric acid and it is intended that continuous operation of the process of this invention would also include a periodic acid wash of the electrode plates.

In addition, in the use of closely generally parallel plate electrodes including end electrodes to which the electrical potential is applied an electrode near at least one end electrode is positioned to protect the end electrode from the flux field effects which would cause a more rapid consumption of the electrode. This feature is also described in U.S. Pat. No. 4,036,726 and that feature is preferred in the cell used in the process of this invention.

In summary, it has been discovered that contaminated groundwater can be treated in-situ by the injection of electrochemically generated ferrous and hydroxyl ions by passing said water through an electrochemical cell having an anode of iron or an iron containing material and, preferably, consisting of closely spaced plates of steel. The ferrous ion is generated at the anode and hydrogen gas bubbles off to the atmosphere at the cathode. The groundwater then passing through the cell is reinjected upstream of the flow. While the cell of this invention generally can comfortably handle a flow rate of 20–150 gallons per minute, it is contemplated that a number of said cells could be used depending upon the flow to be treated.

The ferrous ion generated then forms a ferrous compound or complex with the hydroxyl ions which in turn will react with hexavalent chromium to form a compound or complex therewith by reducing the hexavalent to trivalent chromium. The flocculent thus formed can be retained in the ground as a permanently immobilized compound. In addition, unreacted ferrous or ferrous hydrous complexes also are excellent absorbents for other heavy metals in the soil which will further immobilize these contaminants.

It should be emphasized then that immobilization within the soil occurs by the injection only of ferrous ions and hydroxyl ions generated by the electrochemical cell of this invention and when properly employed, substantially no toxic sludge will be generated for surface disposal.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim

1. A method for removing hexavalent chromium contaminants from groundwater along with any heavy metal ions which are capable of forming an insoluble iron compound or complex comprising the steps of:

providing an electrochemical cell comprising a pair of outer electrode elements which are, respectively, an anode and a cathode, positioned in a parallel spaced apart relationship and a plurality of additional electrode elements disposed between said outer electrode elements in a closely spaced relationship therewith, said additional elements being substantially equidistantly spaced, one from another, and disposed parallel to said outer electrodes;

locating said cell in proximity to a flow of groundwater containing hexavalent chromium ions or said other heavy metal ions and removing a portion of said groundwater flow and directing it through said electrochemical cell while passing an electric current through the cell between the anode and cathode so as to anodically produce ferrous ions while cathodically producing hydroxide ions said ferrous ions being entrained in said flow; and injecting the flow of water from between said electrodes containing unreacted ferrous ions into said groundwater upstream of where said portion was removed.

2. The method of claim 1 wherein the pH of the water admitted to the cell is between 4 and 11.

3. The method of claim 1 further comprising periodically treating the electrodes with a dilute inorganic acid solution by flowing said acid solution along and between the surfaces of said electrodes at a flow rate sufficient to provide mechanical washing action to remove any electrochemically formed substances on the surfaces of or lodged between adjacent electrodes.

4. The method of claim 1 wherein said anode, cathode, and additional electrodes are rolled steel.

5. The process of claim 1 wherein said cell further comprises one additional electrode element in neighboring relationship to each of said outer electrode elements of sufficient size so as to extend beyond said outer electrode element to shield said outer electrode element from flux field effects causing excessive current density.

* * * * *